Patented Nov. 1, 1932

1,885,447

UNITED STATES PATENT OFFICE

PIERRE JOLIBOIS, OF PARIS, AND GEORGES CHAUDRON, OF LILLE, FRANCE

PROCESS FOR THE PREPARATION OF A CHLORO-PHOSPHATE OF LEAD

No Drawing. Application filed February 19, 1931, Serial No. 517,104, and in France February 27, 1930.

The present invention relates to a process enabling the preparation, from a natural phosphate of lime, of a chloro-phosphate of lead which is very rich in phosphate.

In conformity to the invention, the natural phosphate of lime is subjected to a grinding, optionally followed by a disintegration by hydrochloric acid, then adding a salt of lead, in such manner as to effect a double decomposition between the phosphate of lime and the salt of lead.

It is advantageous, for the economical operation of the process, that the natural calcium phosphate shall be eliminated in the state of calcium chloride, $CaCl_2$. It is thus preferable to use as the lead salt, the lead chloride $PbCl_2$, or litharge, or lead carbonate in the presence of hydrochloric acid.

In these conditions, the lead phosphate will be alone precipitated, and by filtering and decantation, it can be readily separated from the solution of calcium chloride.

In order to obtain a complete reaction, it is advisable to avoid all excess of hydrochloric acid in the liquid form which the lead phosphate is precipitated. This result can be obtained for example by adding lime or carbonate of lime.

The reaction takes place in the cold, but to make it more rapid, it is preferable to heat the whole to 60°–100° C. in an autoclave.

It is advisable to operate in the presence of a slight excess of natural phosphate of lime, as thus the losses of lead will be absolutely negligible. If, however, any lead should remain in the mother-liquor, it is simply necessary to add a small amount of a solution of natural phosphate in hydrochloric acid in order to precipitate the lead in the state of lead phosphate. It can also be precipitated by hydrogen sulphide, thus obtaining the sulphide PbS, which can be used for the preparation of lead oxide or chloride by any suitable means. It is further possible to add a slight excess of lime or carbonate of lime, which precipitates the phosphorus and the lead at the same time.

This affords a precipitate of chloro-phosphate of lead $PbCl_2.3(P_2O_5.3PbO)$ which may in certain cases be contaminated by a small additional amount of $PbCl_2$.

According to an operating method which is indicated by way of example, a certain quantity of natural phosphate of lime is pulverized, containing 50 kgs. of $P_2O_5.3CaO$, then adding 150 kgs. of $PbCl_2$, which corresponds to about 3 molecules of $P_2O_5$ for 10 molecules of $PbCl_2$.

The mixture is placed in suspension in 1200 liters of water, and is heated to 100° C. for 30 hours, agitating by a current of air.

The washed and dried precipitate contains:

| | |
|---|---|
| Pb | 73.1 per cent |
| Cl | 2.8 per cent |
| $P_2O_5$ | 14.9 per cent |
| Ca | traces | which corresponds nearly to the formula:

$$PbCl_2.3(P_2O_5.3PbO).$$

The filtrate does not contain $P_2O_5$.

The same result was obtained in the tests in which litharge was employed.

We claim:

1. A process of preparing a chloro-phosphate of lead from a natural phosphate of lime, which comprises subjecting the natural phosphate to grinding, treating it with lead chloride, and separating from the solution the resulting precipitate of chloro-phosphate of lead.

2. A process of preparing a chloro-phosphate of lead from a natural phosphate of lime, which comprises subjecting the natural phosphate to grinding, treating it with hydrochloric acid, treating it with lead chloride, and separating from the solution the resulting precipitate of chloro-phosphate of lead.

3. A process as set forth in claim 2, wherein lime is added to prevent the presence of an excess of hydrochloric acid.

4. A process of preparing a chloro-phosphate of lead from a natural phosphate of lime, which comprises subjecting the natural phosphate to grinding, treating it, in presence of the hydrochloric acid, with a salt of lead selected from the group consisting of litharge, lead chloride, and lead carbonate, and separating from the solution the resulting precipitate of chloro-phosphate of lead.

In testimony whereof, they affix their signatures.

PIERRE JOLIBOIS.
GEORGES CHAUDRON.